United States Patent
Baik

(10) Patent No.: US 8,510,896 B2
(45) Date of Patent: Aug. 20, 2013

(54) WIPER DEVICE FOR VEHICLE

(75) Inventor: Seung Kil Baik, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/550,284

(22) Filed: Jul. 16, 2012

(65) Prior Publication Data

US 2013/0145570 A1 Jun. 13, 2013

(30) Foreign Application Priority Data

Dec. 8, 2011 (KR) .................. 10-2011-0130985

(51) Int. Cl.
*B60S 1/16* (2006.01)
*B60S 1/06* (2006.01)

(52) U.S. Cl.
USPC ...... 15/250.31; 15/250.3; 192/56.1; 192/56.6

(58) Field of Classification Search
USPC ............... 15/250.3, 250.31, 250.27, 250.14, 15/250.19, 250.16; 192/56.1, 56.6, 56.61
See application file for complete search history.

(56) References Cited

U.S. PATENT DOCUMENTS

| 1,973,071 | A | * | 9/1934 | Hilton | 15/250.19 |
| 2,693,613 | A | * | 11/1954 | Zeigler et al. | 15/250.01 |
| 3,016,766 | A | * | 1/1962 | Hoyler | 384/276 |
| 3,261,215 | A | * | 7/1966 | Simpson | 74/42 |
| 4,938,526 | A | * | 7/1990 | Sannomiya et al. | 296/192 |
| 5,441,227 | A | * | 8/1995 | Hayashi | 248/274.1 |
| 5,570,923 | A | * | 11/1996 | Taylor | 296/164 |
| 5,685,195 | A | * | 11/1997 | Rienhardt | 74/42 |
| 6,026,536 | A | * | 2/2000 | Miller et al. | 15/250.31 |
| 2001/0001336 | A1 | * | 5/2001 | Kobayashi et al. | 15/250.3 |

* cited by examiner

*Primary Examiner* — Gary Graham
(74) *Attorney, Agent, or Firm* — Morgan, Lewis & Bockius LLP

(57) ABSTRACT

A wiper device for a vehicle may include a lower pivot shaft integrally coupled at a lower end thereof to a link lever that may be rotated by a force transmitted from a wiper motor, thus enabling the lower pivot shaft to rotate, wherein the lower pivot shaft includes a coupling protrusion protruding integrally from an upper end of the lower pivot shaft, an upper pivot shaft seated on an upper surface of the lower pivot shaft, the upper pivot shaft having a coupling recess integrally formed on a lower surface thereof to selectively fit the coupling protrusion therein, wherein an arm head may be integrally coupled to an upper end of the upper pivot shaft that protrudes above a cowl top panel, and a shaft holder secured to the cowl top panel while engaging therein a coupled portion between the lower pivot shaft and the upper pivot shaft.

9 Claims, 3 Drawing Sheets

WIPER DEVICE FOR VEHICLE

CROSS-REFERENCE TO RELATED APPLICATION

The present application claims priority to Korean Patent Application No. 10-2011-0130985, filed on Dec. 8, 2011, the entire contents of which is incorporated herein for all purposes by this reference.

BACKGROUND OF THE INVENTION

1. Field of the Invention

The present invention relates generally to a wiper device for a vehicle and, more particularly, to a wiper device for a vehicle, intended to prevent parts of the wiper device from being deformed, damaged or burned out when a wiping operation is not smooth because of snow on a windshield glass or a frozen windshield glass in winter.

2. Description of Related Art

Generally, as shown in FIG. 1, a wiper device is provided on a vehicle and includes a wiper motor 1, a link rod 2, a link lever 3, a pivot shaft 4, an arm head 5, and a wiper blade 7. The wiper motor 1 is driven in response to an operating signal transmitted from a wiper switch, which is one among the multi-functional switches that are provided on the steering wheel in the driver's seat. The link rod 2 receives a rotating force from the wiper motor 1 and performs a linear motion. The link lever 3 converts the linear motion of the link rod 2 into a rotating motion. The pivot shaft 4 is coupled at a lower end thereof to the link lever 3 to rotate along with the link lever 3. The arm head 5 is coupled to an upper end of the pivot shaft 4 to rotate along with the pivot shaft 4. The wiper blade 7 is coupled to an end of the arm head 5 to wipe the windshield glass 6.

Here, as shown in FIG. 2, the pivot shaft 4 is installed to pass through a cowl top panel 8. A pivot holder 9 is fixedly installed to pass through the cowl top panel 8, and the pivot shaft 4 rotatably passes through the pivot holder 9.

Meanwhile, when the windshield glass 6 and the cowl top panel 8 are covered with snow or the windshield glass 6 is covered with frozen material in winter, the external force of the snow or freezing acts on the arm head 5 and the wiper blade 7, so that the wiping operation is not smooth.

When the above-mentioned problem occurs, in the case of the conventional wiper device, the wiper motor 1 continues to generate a rotating force, but the pivot shaft 4 does not rotate but is fixed together with the wiper blade 7 and the arm head 5 by the external force. Thus, the conventional wiper device is problematic in that the wiper motor 1 is overheated and burns out or parts including the arm head 5 and the link lever 3 are deformed or damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wiper device for a vehicle, intended to prevent a wiper motor from burning out or prevent parts such as an arm head or a link lever from being deformed or damaged, when a wiping operation does not take place smoothly because a windshield glass and a cowl top panel have been covered with snow or the windshield glass has frozen in winter.

In an aspect of the present invention, a wiper device for a vehicle may include a lower pivot shaft integrally coupled at a lower end thereof to a link lever that is rotated by a force transmitted from a wiper motor, thus enabling the lower pivot shaft to rotate, wherein the lower pivot shaft may include a coupling protrusion protruding integrally from an upper end of the lower pivot shaft, an upper pivot shaft seated on an upper surface of the lower pivot shaft, the upper pivot shaft having a coupling recess integrally formed on a lower surface thereof to selectively fit the coupling protrusion therein, wherein an arm head is integrally coupled to an upper end of the upper pivot shaft that protrudes above a cowl top panel, and a shaft holder secured to the cowl top panel while engaging therein a coupled portion between the lower pivot shaft and the upper pivot shaft, thus preventing the lower pivot shaft and the upper pivot shaft from separating from each other.

The lower pivot shaft and the upper pivot shaft are coaxially aligned.

The coupling recess is formed offset from a rotation center of the upper pivot shaft.

The coupling protrusion is formed offset from a rotation center of the lower pivot shaft.

The wiper device may include an elastic member provided in the shaft holder, wherein one end of the elastic member is supported by the upper pivot shaft and the other end thereof is supported by the shaft holder, thus providing an elastic force to the upper pivot shaft to allow the upper pivot shaft to be in contact with the lower pivot shaft.

The wiper device may include a first flange portion having a diameter larger than a diameter of the lower pivot shaft and being integrally formed on the upper end of the lower pivot shaft, and a second flange portion having a diameter larger than a diameter of the upper pivot shaft and being integrally formed on a lower end of the upper pivot shaft, respectively, wherein a lower end of the elastic member is supported by the second flange portion of the upper pivot shaft.

The coupling protrusion provided on the first flange portion of the lower pivot shaft and the coupling recess provided on the second flange portion of the upper pivot shaft are formed to may have equiangular trapezoidal sections, respectively, wherein the coupling recess is formed offset from a rotation center of the upper pivot shaft, and wherein the coupling protrusion is formed offset from a rotation center of the lower pivot shaft.

The shaft holder may include a casing member secured to the cowl top panel while passing through the cowl top panel, and having a lower cover integrally formed at a bottom of the casing member to seat the first flange portion of the lower pivot shaft thereon, wherein the elastic member is accommodated between the casing member and the upper pivot shaft and mounted on the second flange portion, and a washer member secured to an upper end of the casing member to support the upper end of the elastic member, wherein the upper pivot shaft is assembled to pass through the washer.

The elastic member may include a compression spring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
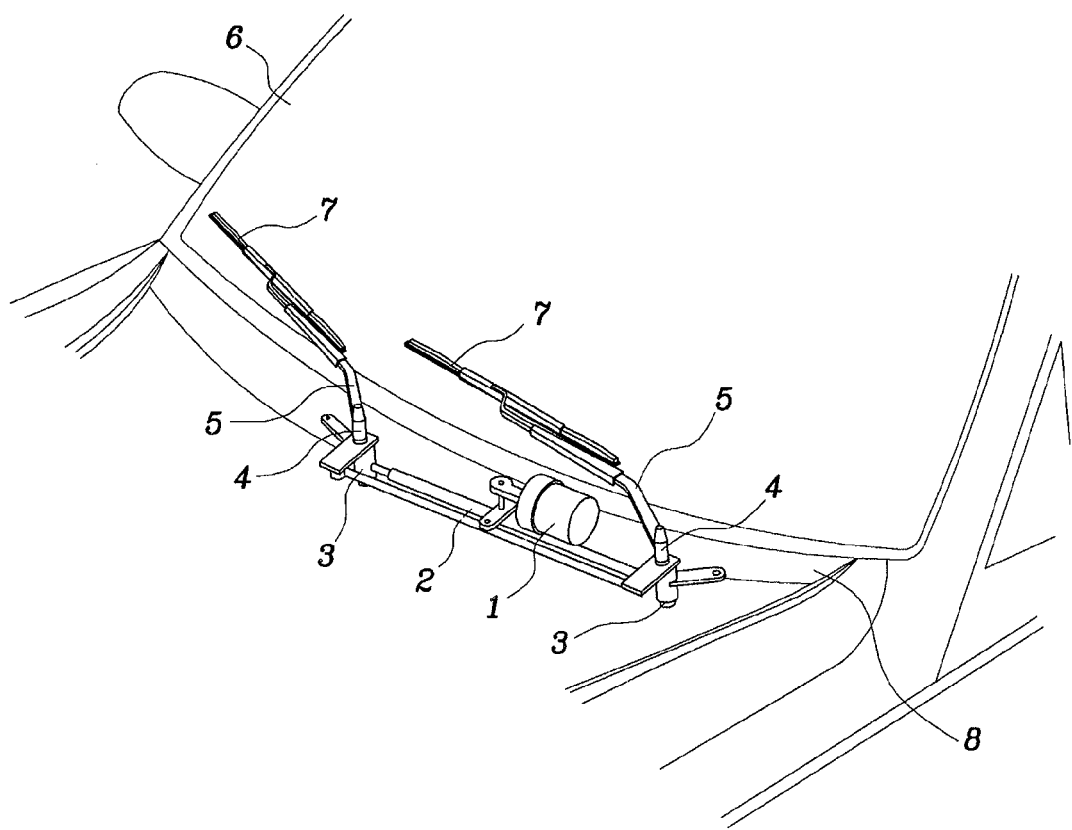
FIGS. 1 and 2 are views illustrating a vehicle having a conventional wiper device.
Figure 2:
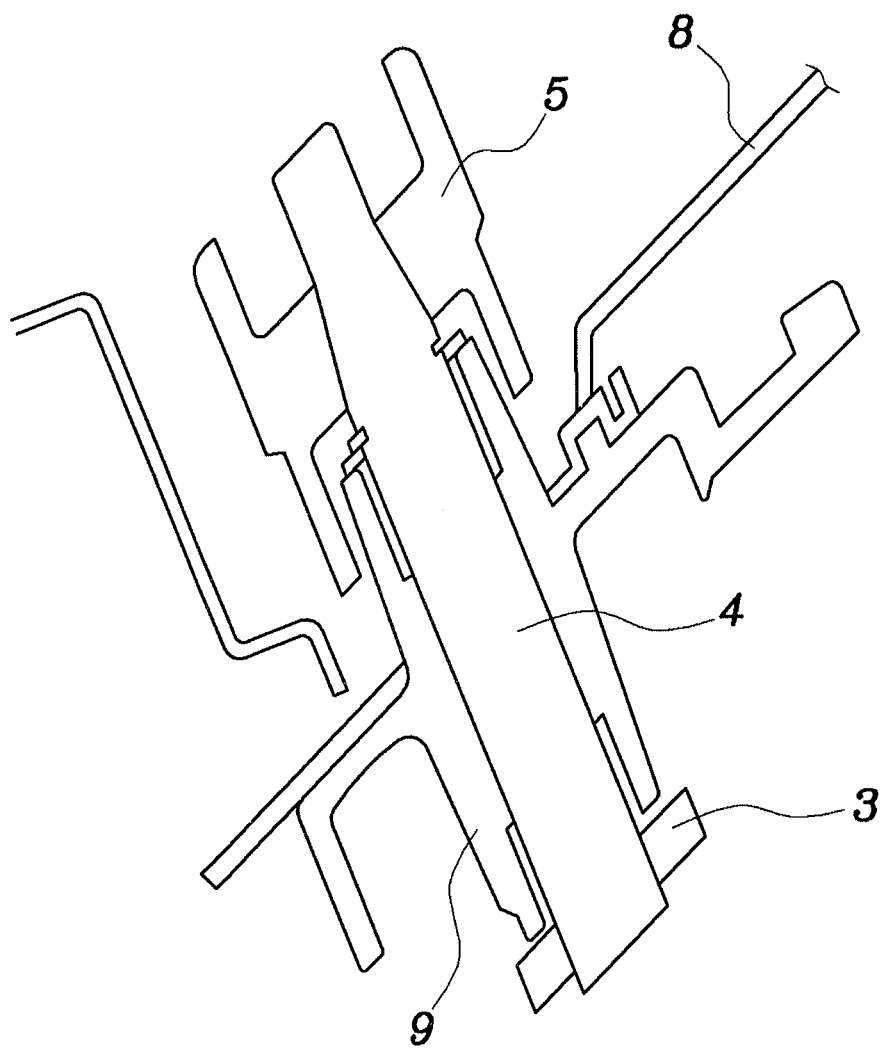

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a wiper device for a vehicle in accordance with a preferred embodiment of the present invention will be described with reference to the accompanying drawings.

Figure 3:
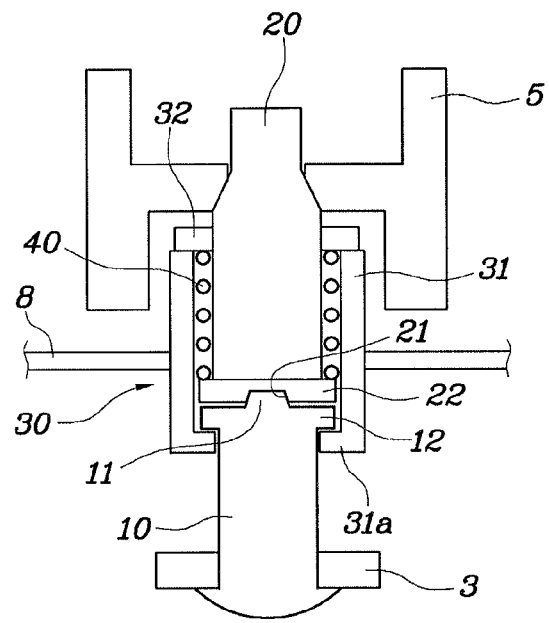
FIG. 3 is a view illustrating a wiper device in accordance with the present invention.
Figure 4:
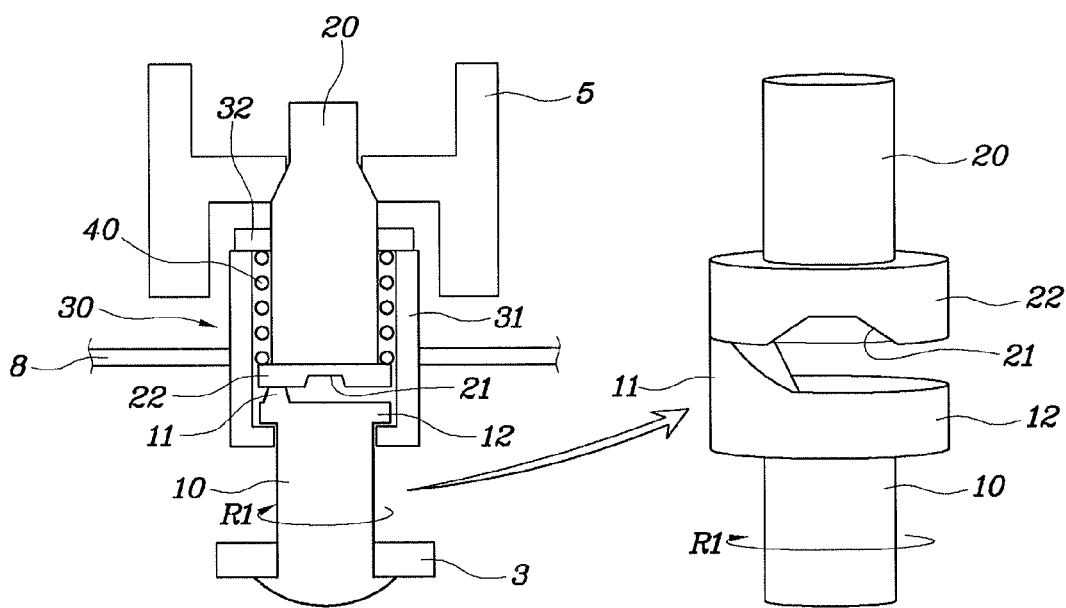
FIG. 4 is a view illustrating an operating state of the wiper device in accordance with the present invention.

Since components of the wiper device which are not shown in FIGS. 3 and 4, namely, a wiper motor, a link rod and a wiper blade remain the same as those described above with reference to FIG. 1, the components will carry the same reference numerals as FIG. 1.

As shown in FIGS. 3 and 4, the wiper device for the vehicle according to an exemplary embodiment of the present invention includes a wiper motor 1 which is driven in response to an operating signal transmitted from a wiper switch which is one of the multi-function switches that are provided on a steering wheel in the driver's seat.

A link rod 2 receives a rotating force from the wiper motor 1 to perform a linear motion.

A link lever 3 is coupled at one end thereof to the link rod 2 to perform a rotating motion using the linear motion of the link rod 2.

A lower pivot shaft 10 is integrally coupled at a lower end thereof to the other end of a link lever 3, so that the lower pivot shaft 10 rotates when the link lever 3 rotates, with a coupling protrusion 11 protruding integrally from an upper end of the lower pivot shaft 10.

An upper pivot shaft 20 is seated on an upper surface of the lower pivot shaft 10, and has a coupling recess 21 which is integrally formed on a lower surface of the upper pivot shaft 20 so that the coupling protrusion 11 fits therein.

An arm head 5 is integrally coupled at one end thereof to an upper end of the upper pivot shaft 20, thus performing rotating motion about the point of coupling between the arm head 5 and the upper pivot shaft 20.

A wiper blade 7 is coupled to an end of the arm head 5 to wipe a windshield glass 6. A shaft holder 30 is secured to a cowl top panel 8 while surrounding a coupled portion between the lower pivot shaft 10 and the upper pivot shaft 20, thus preventing the lower pivot shaft 10 and the upper pivot shaft 20 from separating from each other.

An elastic member 40 is provided in the shaft holder 30 in such a way that one end of the elastic member 40 is supported by the upper pivot shaft 20 and the other end is supported by the shaft holder 30, thus providing an elastic force to the upper pivot shaft 20 to allow the upper pivot shaft 20 to come into close contact with the lower pivot shaft 10.

Here, flange portions 12 and 22 each having an enlarged diameter are integrally formed on an upper end of the lower pivot shaft 10 and a lower end of the upper pivot shaft 20, respectively, and a lower end of the elastic member 40 is supported by the flange portion 22 of the upper pivot shaft 20.

Further, the coupling protrusion 11 and the coupling recess 21 provided on the flange portions 12 and 22 of the lower pivot shaft 10 and the upper pivot shaft 20 are formed to have equiangular trapezoidal sections, respectively.

The reason why the coupling protrusion 11 and the coupling recess 21 have the equiangular trapezoidal sections, respectively, is as follows. When a wiping signal is generated in winter, the wiper blade 7 or the arm head 5 may be fixed by an external force such as snow and thus may not smoothly perform the rotating motion. In this case, the above-mentioned sectional shape allows only the lower pivot shaft 10 to be rotated while the lower pivot shaft 10 receiving the force of the wiper motor 1 is released from the upper pivot shaft 20. Consequently, the deformation of or damage to a link mechanism such as the wiper blade 7 or the arm head 5 is prevented, and simultaneously the burning out of the wiper motor 1 is prevented.

In a normal state, for the wiping operation to be smooth, the coupling protrusion 11 of the lower pivot shaft 10 should be fitted into the coupling recess 21 of the upper pivot shaft 20 to maintain the coupling of the lower pivot shaft 10 with the upper pivot shaft 20. On the other hand, if the wiping operation does not take place smoothly because of an external force such as snow, the coupling protrusion 11 should be removed smoothly from the coupling recess 21 by the rotating force of the lower pivot shaft 10 that is rotated by the force of the wiper motor 1.

In an exemplary embodiment of the present invention, the coupling recess 21 is formed offset from a rotation center of the upper pivot shaft 20.

In an exemplary embodiment of the present invention, the coupling protrusion 11 is formed offset from a rotation center of the lower pivot shaft 10.

Thus, in the wiper device according to an exemplary embodiment of the present invention, a protruding length of the coupling protrusion 11, a depth of the coupling recess 21, inclination angles of the coupling protrusion 11 and the coupling recess 21, and the elastic force of the elastic member 40 are important factors that affect the operation of the wiper device of the present invention, and can be appropriately tuned to determine the operation of the wiper device.

Meanwhile, the shaft holder 30 includes a casing member 31 and a washer member 32. The casing member 31 is secured to the cowl top panel 8 while passing through the cowl top panel 8. A lower cover 31a is integrally formed on the casing member 31 to seat the flange portion 12 of the lower pivot shaft 10 thereon, with a space provided between the casing member 31 and the lower pivot shaft 10 to accommodate the elastic member 40 therein. A washer member 32 is secured to an upper end of the casing member 31 to support the upper end of the elastic member 40.

Further, the elastic member 40 according to an exemplary embodiment of the present invention elastically biases the upper pivot shaft 20 towards the lower pivot shaft 10. To this end, the elastic member 40 is preferably a compression spring.

Hereinafter, the operation of the wiper device according to an exemplary embodiment of the present invention will be described.

If a driver manipulates the wiper switch in a normal state, the link lever 3 performs a rotating motion by a force transmitted from the wiper motor 1 through the link rod 2. As the link lever 3 rotates, the lower pivot shaft 10 also rotates. A rotating force of the lower pivot shaft 10 is transmitted to the upper pivot shaft 20 because of the coupling force of the coupling protrusion 11 with the coupling recess 21, so that the upper pivot shaft 20 also rotates together.

As the upper pivot shaft 20 rotates, the arm head 6 and the wiper blade 7 also rotate. Thereby, the normal operation wherein the wiper blade 7 wipes the windshield glass 6 is carried out.

Further, in the event that snow covers the windshield glass 6 and the cowl top panel 8 or freezes on the windshield glass 6 in winter, an external force such as snow or freezing acts on the arm head 5 and the wiper blade 7. In this case, even if the wiper motor 1 is in operation, the wiping operation is not smoothly performed by the external force acting on the arm head 5 and the wiper blade 7.

As such, when the external force acts on the arm head 5 and the wiper blade 7, the lower pivot shaft 10 is rotated by the force transmitted from the wiper motor 1, but the upper pivot shaft 20 does not rotate because the arm head 5 and the wiper blade 7 are fixed by the external force.

Thus, the coupling protrusion 11 fitted into the coupling recess 21 as shown in FIG. 3 is removed from the coupling recess 21 by the rotating force (clockwise rotation in a direction of arrow R1 shown in FIG. 4) of the lower pivot shaft 10 as shown in FIG. 4, so that only the lower pivot shaft 10 connected to the wiper motor 1 rotates, and the upper pivot shaft 20 connected to the arm head 5 does not rotate.

Therefore, when the external force such as snow or freezing affects the arm head 5 and the wiper blade 7, only the lower pivot shaft 10 rotates and the upper pivot shaft 20 does not rotate, thus preventing the link mechanism such as the wiper blade 7 or the arm head 5 from being deformed and damaged, and particularly preventing the wiper motor 1 from burning out due to the overheating of the wiper motor 1.

Further, the coupling protrusion 11 removed from the coupling recess 21 is in brought into contact with a bottom of the flange portion 22 of the lower pivot shaft 10. In this state, if the lower pivot shaft 10 is rotated counterclockwise, namely, in a direction opposite to the direction R1 shown by FIG. 4, by a reverse rotation of the wiper motor 1, the coupling protrusion 11 is inserted into the coupling recess 21 again. Consequently, the wiper device is switched into the normal state in which the wiping operation is smoothly performed.

As described above, the present invention provides a wiper device for a vehicle, which is configured so that only a lower pivot shaft is rotated by a force of a wiper motor but an upper pivot shaft does not rotate in the event that an external force such as snow or frozen material exerts a force on an arm head or a wiper blade, thus preventing a link mechanism such as the wiper blade or the arm head from being deformed or damaged and particularly preventing the wire motor from being burned out due to overheating.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper device for a vehicle, comprising:
    a lower pivot shaft integrally coupled at a lower end thereof to a link lever that is rotated by a force transmitted from a wiper motor, thus enabling the lower pivot shaft to rotate, wherein the lower pivot shaft includes a coupling protrusion protruding integrally from an upper end of the lower pivot shaft;
    an upper pivot shaft seated on an upper surface of the lower pivot shaft, the upper pivot shaft having a coupling recess integrally formed on a lower surface thereof to selectively fit the coupling protrusion therein, wherein an arm head is integrally coupled to an upper end of the upper pivot shaft that protrudes above a cowl top panel;
    a shaft holder secured to the cowl top panel while engaging therein a coupled portion between the lower pivot shaft and the upper pivot shaft, thus preventing the lower pivot shaft and the upper pivot shaft from separating from each other; and
    an elastic member provided in the shaft holder, wherein one end of the elastic member is supported by the upper pivot shaft and the other end thereof is supported by the shaft holder, thus providing an elastic force to the upper pivot shaft to allow the upper pivot shaft to be in contact with the lower pivot shaft;
    wherein a first flange portion having a diameter larger than a diameter of the lower pivot shaft and being integrally formed on the upper end of the lower pivot shaft; and
    wherein a second flange portion having a diameter larger than a diameter of the upper pivot shaft and being integrally formed on a lower end of the upper pivot shaft, respectively, wherein a lower end of the elastic member is supported by the second flange portion of the upper pivot shaft.

2. The wiper device as set forth in claim 1, wherein the lower pivot shaft and the upper pivot shaft are coaxially aligned.

3. The wiper device as set forth in claim 1, wherein the coupling recess is formed offset from a rotation center of the upper pivot shaft.

4. The wiper device as set forth in claim 1, wherein the coupling protrusion is formed offset from a rotation center of the lower pivot shaft.

5. The wiper device as set forth in claim 1, wherein the coupling protrusion provided on the first flange portion of the lower pivot shaft and the coupling recess provided on the second flange portion of the upper pivot shaft are formed to have equiangular trapezoidal sections, respectively.

6. The wiper device as set forth in claim 5, wherein the coupling recess is formed offset from a rotation center of the upper pivot shaft.

7. The wiper device as set forth in claim 5, wherein the coupling protrusion is formed offset from a rotation center of the lower pivot shaft.

8. The wiper device as set forth in claim 1, wherein the shaft holder includes:
- a casing member secured to the cowl top panel while passing through the cowl top panel, and having a lower cover integrally formed at a bottom of the casing member to seat the first flange portion of the lower pivot shaft thereon, wherein the elastic member is accommodated between the casing member and the upper pivot shaft and mounted on the second flange portion; and
- a washer member secured to an upper end of the casing member to support the upper end of the elastic member, wherein the upper pivot shaft is assembled to pass through the washer.

9. The wiper device as set forth in claim 1, wherein the elastic member includes a compression spring.

* * * * *